United States Patent [19]
Huynh et al.

[11] Patent Number: 5,386,561
[45] Date of Patent: Jan. 31, 1995

[54] METHOD OF INTEGRATED SYSTEM LOAD CONTROL THROUGH DYNAMIC TIME-SLICING IN A VIRTUAL STORAGE ENVIRONMENT

[75] Inventors: Khoa D. Huynh, Miami; Charles M. Norcutt, Jr., Boca Raton; Theodore C. Waldron III, Sunrise, all of Fla.

[73] Assignee: International Business Machines Corporation, Armonk, N.Y.

[21] Appl. No.: 861,221

[22] Filed: Mar. 31, 1992

[51] Int. Cl.[6] .............................. G06F 9/38
[52] U.S. Cl. .................. 395/650; 364/DIG. 1; 364/231.6; 364/254.3; 364/281.4
[58] Field of Search ........................ 395/650; 364/DIG. 1 MS File

[56] References Cited

U.S. PATENT DOCUMENTS

| | | |
|---|---|---|
| 4,035,778 | 7/1977 | Ghanem ............ 364/DIG. 1 |
| 4,422,145 | 12/1983 | Sacco et al. ........ 364/DIG. 1 |
| 4,430,701 | 2/1984 | Christian et al. .... 364/DIG. 1 |
| 4,736,318 | 4/1988 | Delyani et al. |
| 4,742,447 | 5/1988 | Duvall et al. |
| 4,908,750 | 3/1990 | Jablow . |
| 5,012,408 | 4/1991 | Conroy . |
| 5,210,872 | 5/1993 | Ferguson et al. .......... 395/650 |

Primary Examiner—Thomas M. Heckler
Attorney, Agent, or Firm—Bruce D. Jobse; Andrew J. Dillon

[57] ABSTRACT

A priority preemptive, time distribution operating system operating in accordance with the method of the present invention provides enhanced efficiency in operation of a data processing system having a central processing unit, a computer memory and an auxiliary memory. The operating system manages the central processing unit, the computer memory and the auxiliary memory where a plurality of processes are presented for execution on the central processing unit by: ordering the processes for execution; allocating a predetermined time slice for execution of a process from the ordering; executing a first current process in the ordering on the central processing unit for the predetermined time slice; responsive to occurrence of a storage access operation during execution of the first current process, allocating a supplemental time slice to the current process for execution; and continuing execution of the current process for the supplemental time slice.

9 Claims, 5 Drawing Sheets

METHOD OF INTEGRATED SYSTEM LOAD CONTROL THROUGH DYNAMIC TIME-SLICING IN A VIRTUAL STORAGE ENVIRONMENT

BACKGROUND OF THE INVENTION

1. Technical Field

The invention relates to processor scheduling for a computer and more particularly to regulation of time slice durations allocated processes for execution. Still more particularly, the invention relates to the dynamic regulation of time slice duration as a function of selected operating environment conditions relating to the possible occurrence of memory churning.

2. Description of the Related Art

Microcomputer systems based upon either the Intel 80386 microprocessor or the 80486 microprocessor available from Intel Corp. and utilizing an OS/2 ® version 2.x operating system available from International Business Machines Corporation have considerable capacity for executing multiple concurrent processes. For example, such a microcomputer system can support emulation of a plurality of concurrent virtual DOS machines ("VDMs"), which in turn execute MS-DOS ® (a registered trademark of Microsoft Corporation) version specific application programs.

To the user, one desktop personal computer appears to simultaneously function as two or more Intel 8086 microprocessor based machines utilizing distinct versions of MS-DOS, such as versions 2.0 or 3.2. This allows the user to run version specific application programs, such as games, word processing programs, or other applications. Each virtual machine is an example of a process, or collection of processes, which may be displayed to the user on the system display device in its own window or represented as a icon.

In the computer, a single microprocessor, functioning as the computer's central processing unit periodically executes the process corresponding to each of the current processes. The concurrent existence of several VDMs means the concurrent existence of numerous processes. Because only one process at a time is executed on the processor, central processing unit time must be allocated. Operating systems have long dealt with multitasking of computer processors and are known as time distribution operating systems. The operating system includes still another process, called the scheduler, which is periodically run to schedule tasks for the processor.

Processes are ranked in priority for the scheduler. For example, processes relating to update of the display image on a video display device may be run on a real time basis, to give the user the impression of near instantaneous responsiveness of the computer. Housekeeping tasks may be relegated to the lowest priority levels. Intermediate priority levels exist for remaining applications, based upon various factors. Processes of equal execution priority are granted central processing unit time on a rotating basis, with each process getting a predefined quanta of time known as a time slice.

A current process is one allocated some physical location in computer memory. The term "computer memory" is used here in reference to program addressable storage from which instructions and other data can be loaded directly into registers of the central processing unit for subsequent execution or other utilization. Typically, where a plurality of processes are concurrent, insufficient space will exist in computer memory to satisfy the demands of all of the processes. Computer memory will not have a sufficient number of storage locations to provide such locations on an exclusive basis for each address space location for all of the processes.

A way of evading the physical constraints on computer memory size has been provided by virtual storage. Virtual storage may be regarded as addressable main storage by the user of a computer in which virtual addresses are mapped into real addresses of the computer memory. The size of virtual storage is limited only by the addressing scheme of the computer and its operating system and by the amount of auxiliary memory available, such a disk drives or tapes. Thus virtual storage is not limited by the actual number of physical locations in computer memory. The practical implication of this arrangement is that some of the instructions and the data for a process will not physically be in computer memory, even though they may be addressed as though they were. Rather, some of the instructions and other data reside on a disk drive or other auxiliary memory device. Upon being addressed, supporting software of the operating system will intervene in a way substantially transparent to the user to move the addressed information to computer memory from which it can be more quickly moved to and from the registers of the central processing unit.

Virtual storage is applied to computer systems having small computer memory, and it is utilized in computer systems executing numerous concurrent processes. For example, each current VDM on a computer has its own virtual storage address space or domain.

Virtual storage however does not come without costs in terms of operating speed, particularly when computer memory is severely oversubscribed. When the central processing unit shifts from one process to another, a phenomena called a context switch occurs. At the end of a time slice an interrupt is applied to the central processing unit from a timer. All of the registers of the old process are saved and registers for the new process are loaded. Where the cumulative space of virtual storage is large this may entail a number of transfers of data between computer memory and auxiliary memory. As the number of current processes increase, and, consequently, the space available in computer memory for each process decreases, the number of transfers of memory pages to and from auxiliary memory (paging) increases. When the computer spends more time paging then performing useful work, memory thrashing is occurring. In the prior art this situation was avoided by blocking addition of new processes to a system when memory commitment reached certain levels.

As a general rule, computer memory is relatively fast, small and expensive while auxiliary memory is cheap, slow and of large capacity. Accesses to auxiliary memory are extremely time consuming relative to central processing unit operating speeds. As the computer is loaded with more current processes, more and more time is devoted to handling problems such as context switches, memory management and process scheduling and less time is devoted to productive work. A predetermined time slice, designed to assure reasonable responsive to each task loaded onto the computer, leads instead to unresponsiveness to all of the tasks.

SUMMARY OF THE INVENTION

It is therefore one object of the invention to provide an improved method of process scheduling for a central processing unit.

It is another object of the invention to provide regulation of time slice durations allocated processes for execution.

It is yet another object of the invention to provide dynamic regulation of time slice duration as a function of selected operating environment conditions relating to the possible occurrence of memory churning.

The foregoing objects are achieved as is now described. A time distribution operating system operating in accordance with the method of the present invention provides enhanced efficiency in operation of a data processing system having a central processing unit, a computer memory and an auxiliary memory. The time distribution operating system manages the central processing unit, the computer memory and the auxiliary memory where a plurality of processes require execution time on the central processing unit by: ordering the processes for execution; allocating a predetermined time slice for execution of a process from the ordering; executing a first current process in the ordering on the central processing unit for the predetermined time slice; responsive to occurrence of a storage access operation during execution of the first current process, allocating a supplemental time slice to the current process for execution; and continuing execution of the current process for the supplemental time slice.

The step of allocating a supplemental time slice depends upon a number of factors. First, the number of free pages in the computer memory is monitored. Responsive to the number of free pages falling below a minimum threshold, a maximum duration time slice is allocated to the current process for continued processing. Where a page fault requiring an input/output operation to the auxiliary memory has occurred, the maximum duration time slice is also allocated to the current process for executing. Other page fault events, particularly a page reclaim not involving an operation to auxiliary memory, result in allocation of additional processing time, depending upon the number of pages reclaimed. When a page is reclaimed the code and data required by the current process will be available on the reclaimed page. Avoiding displacement of the page greatly contributes to operating efficiency in a memory overcommit situation. The allocated period will however be less than the maximum duration time slice.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
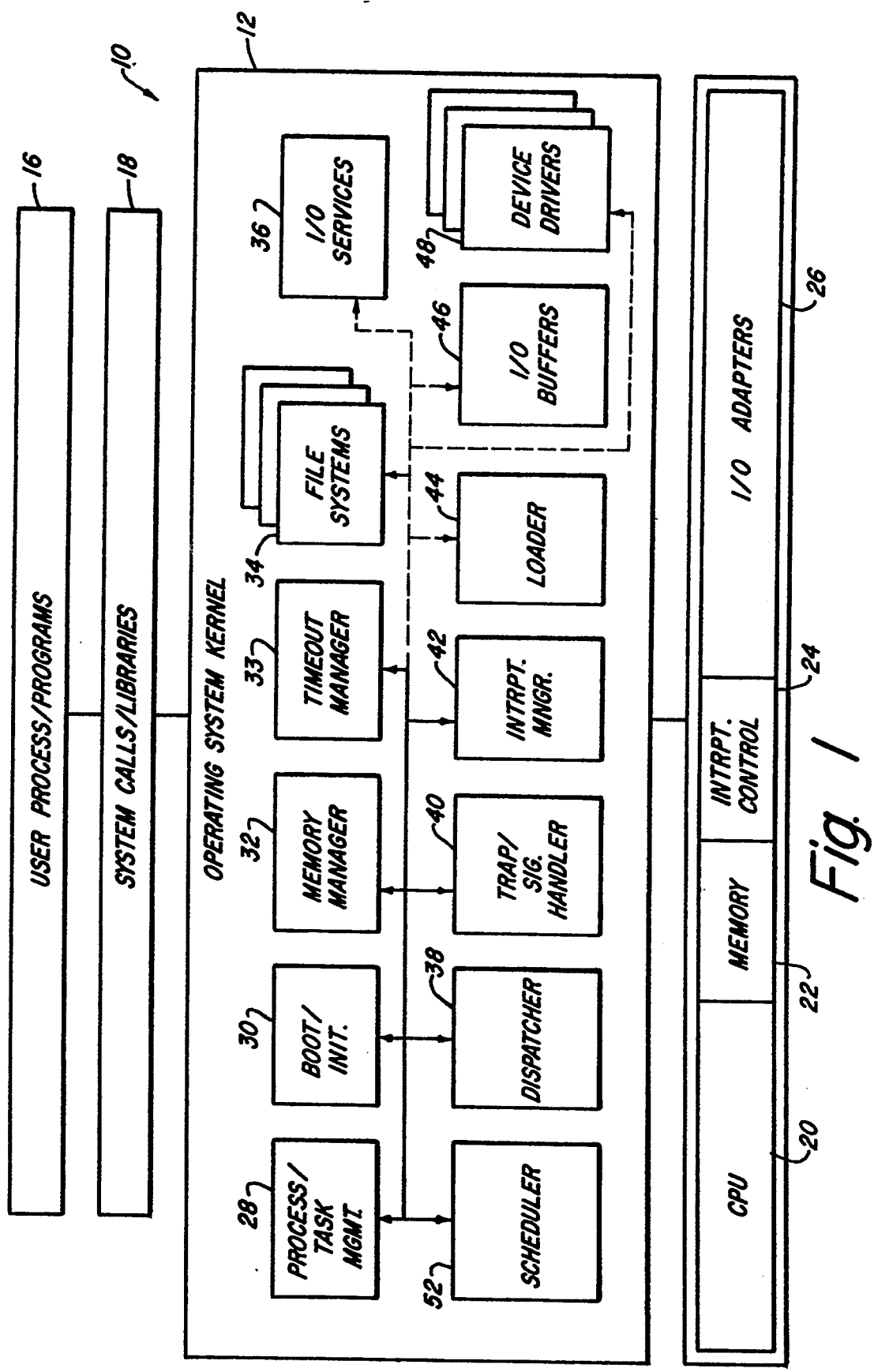
FIG. 1 is a high level block diagram software and hardware components of a data processing system which may be utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. Hardware system 14 includes at a minimum a central processing unit (CPU) 20 and a computer memory 22. Hardware system 14 further preferably includes an interrupt controller 24 and input/output adapters 26.

Also depicted in FIG. 1 are user processes/programs 16 which, in a manner well known to those skilled in the art, access selected procedures within operating system kernel 12 by means of system calls which are depicted at reference numeral 18. As is typical in such systems selected procedures within operating system kernel 12 are designed to be called or invoked by applications within data processing system 10 and thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes or programs may be executed. Operating system kernel 12 provides for the efficient utilization and prevents user application programs from interfering with the proper operation of data processing system 10 by controlling the creation and alteration of files, the control of input/output devices and the provision of multiple device drivers which permits data processing system 10 to interface with various external devices.

Still referring to FIG. 1, it may be seen that operating system kernel 12 includes multiple subsystems, including process/task management system 28 which is utilized to provide task creation, deletion, status and synchronization functions. Boot/initialization system 30 typically is embodied in microcode in non-addressable memory and is utilized to load the operating system into computer memory 22.

Next, memory management system 32 is depicted. Memory management system 32 allocates and deallocates portions of computer memory 22 for data processing system 10. File systems 34 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 36 is depicted. Input/output services system 36 is preferably a functional unit within operating system kernel 12 which controls peripheral hardware.

Next, dispatcher 38 is depicted within operating system kernel 12. Dispatcher 38 places jobs or tasks into execution. Dispatcher 38 is thus responsible for providing multi-tasking and operates in conjunction with a scheduler to implement a particular type of scheduling system. Further cooperating with the scheduler and dispatcher 38 to implement the method and system of the present invention is a time out manager 33 which is utilized to dynamically set time slices allocated for execution of each process dispatched for processing.

Trap and signal handler 40 is also depicted within operating system kernel 12 and is utilized to respond to traps and signals typically activated by hardware system 14. Among the signals generated by hardware 14 are page fault signals indicated operations relating to computer memory 22 and auxiliary memory accessed through I/O adapters 26. Such page fault signals are subdivided into two categories corresponding to the type of memory being accessed. Page reclaim operations relate to a memory paging operation limited to computer memory 11. A page fault requiring I/O operations is the second category. Any auxiliary memory operation requires a relatively large amount of time to execute compared to central processor operation and page reclaims.

Interrupt manager 42 preferably manages interrupt handlers which are set up by the operating system kernel 12 and kernel extensions to take whatever action is necessary to respond to the occurrence of an interrupt. Loader system 44 is also depicted within operating system kernel 12 and, as those skilled in the art appreciate, is typically a routine which loads programs, libraries and kernel extensions. Input/output buffers 46 are depicted within operating system kernel 12 are utilized to temporarily store data during transfer from one hardware device to another in order to compensate for possible differences in data flow rate.

A plurality of device drivers 48 are depicted. Device drivers 48 are typically utilized to attach and use various peripheral devices which may be coupled to data processing system 10. For example, displays, keyboards, printers, floppy disk drives, fixed disk drives and other auxiliary devices are typically controlled from data processing system 10 utilizing a device driver associated with the particular auxiliary device selected for control.

Next, scheduler 52 is depicted. Scheduler 52 orders specific tasks for dispatch to the processor upon indication that a task is "ready to run". Good design of the scheduling algorithm provides both effective use of central processing unit 20 by the various tasks and smooth response to user requests of data processing system 10.

Figure 2:
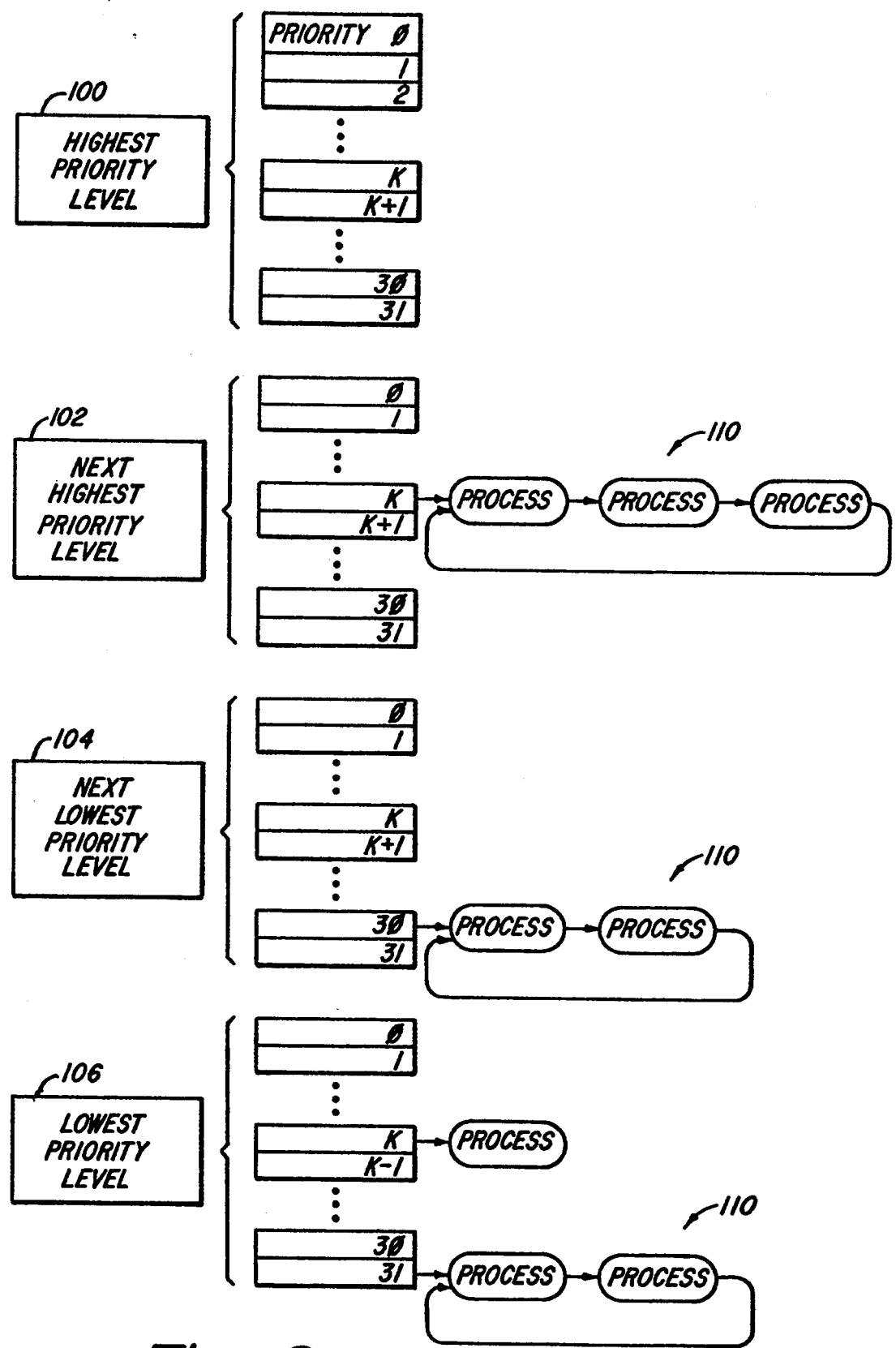
FIG. 2 is a graphical representation of a priority ordering algorithm for task scheduling which may be utilized to implement the method and system of the present invention.

Operating system kernel 12 utilizes a round-robin scheduling algorithm graphically depicted in FIG. 2. Scheduling is based upon a number of factors, including priority category, priority level within a category, and when indication of readiness to run was first noted by the scheduler. When a process becomes ready to run a process control block which represents the process is updated to indicate a change in status. Round-robin scheduling is specifically designed for time sharing systems.

Round-robin scheduling is a priority preemptive algorithm in which processor time and other resource allocations are sequentially dedicated to each task admitted to a ready to run queue. Each task at a given priority level initially has equal claim to processor time. In a round robin the ready to run queue is a linked, circular queue occurring at each priority level. In an algorithm suitable for use with the present invention, 128 priority levels are defined, 32 of which (ranked from the highest priority "0" to lowest priority "31") are associated with four ranked categories of priority 100, 102, 104 and 106. In a typical personal computer system utilizing a graphic user interface (e.g. Windows available from Microsoft Corporation), the highest priority level 100 includes tasks relating to control of the video output interface to a user, i.e. control of image displayed on a monitor. The next highest priority level 102 may include tasks relating to the application programs currently utilized by the user. The lowest priority category 106 may include tasks relating to housekeeping on the computer.

Each priority level at which tasks are ready to run has a ready to run queue 110. Each task receives a quanta of time and if processing is not completed within that set period the task is removed from the central processing unit 20 and returned to the bottom of the ready to run queue for that priority level. If a process voluntarily relinquishes the central processing unit 20 it indicates that the process has reached a state at which it is no longer ready to run and can be removed from the queue. Data processing system 10 operation remains at a given priority level as long as processes remain in the ready to run queue for that level or until a process appears in a ready to run queue for a higher priority level (hence the system is priority preemptive).

Figure 3:
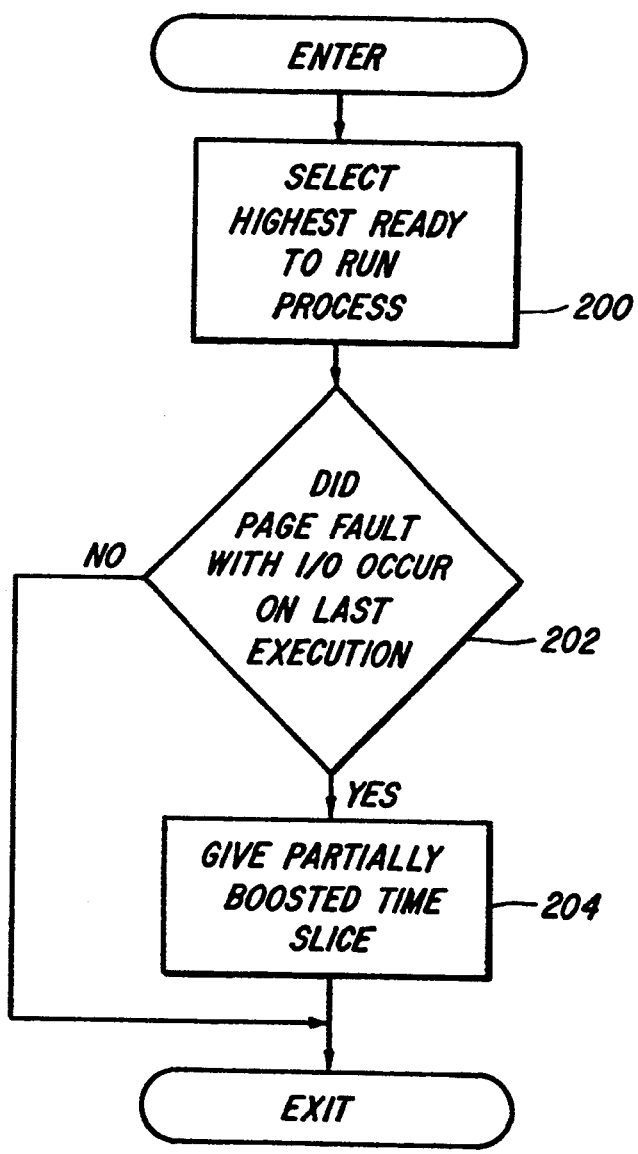
FIG. 3 is a high level logical flow chart illustrating a program implementation of pre-time out scheduling features of a data processing system incorporating the method and system of the present invention.

Prior to occurrence of a time out, scheduler 52 executes a preliminary time slice boost routine. The process is illustrated in FIG. 3 and entered at step 200 where the highest ready to run process is selected. At step 202, it is determined whether a page fault with an I/O operation occurred during the immediately prior execution cycle of the process on CPU 20. If not, no special action is taken and the process is exited to the time out manager 33. If an I/O operation occurred, than at step 204 the selected process is given a partially boosted time slice of 96 milliseconds prior to exit to time out manager 33.

In the prior art, time out management 33 simply determined when a process had consumed its allocated processor time and interrupted processing for a context switch allowing the dispatcher 38 to dispatch the next process scheduled for execution. The system and method of the present invention provides dynamic management of the time slice allowed each task dispatched for execution, depending upon the occurrence of conditions conducive to memory thrashing. Such conditions may arise because of events occurring within the process during execution or because of overcommitment of computer memory 22.

Figure 4:
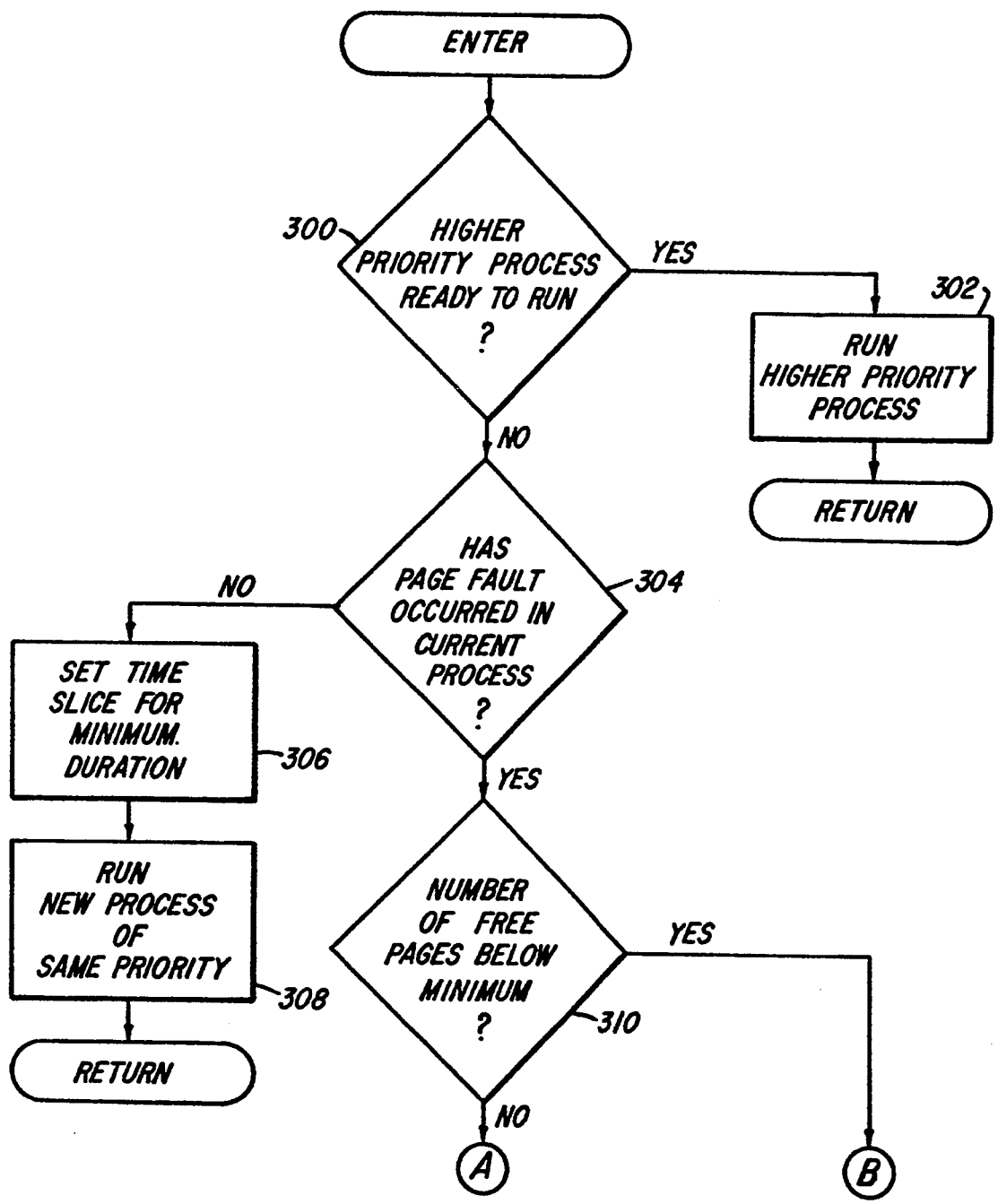
FIGS. 4 and 4a are a high level logical flow chart illustrating a program implementation of the time out management features of a data processing system.
Figure 4A:
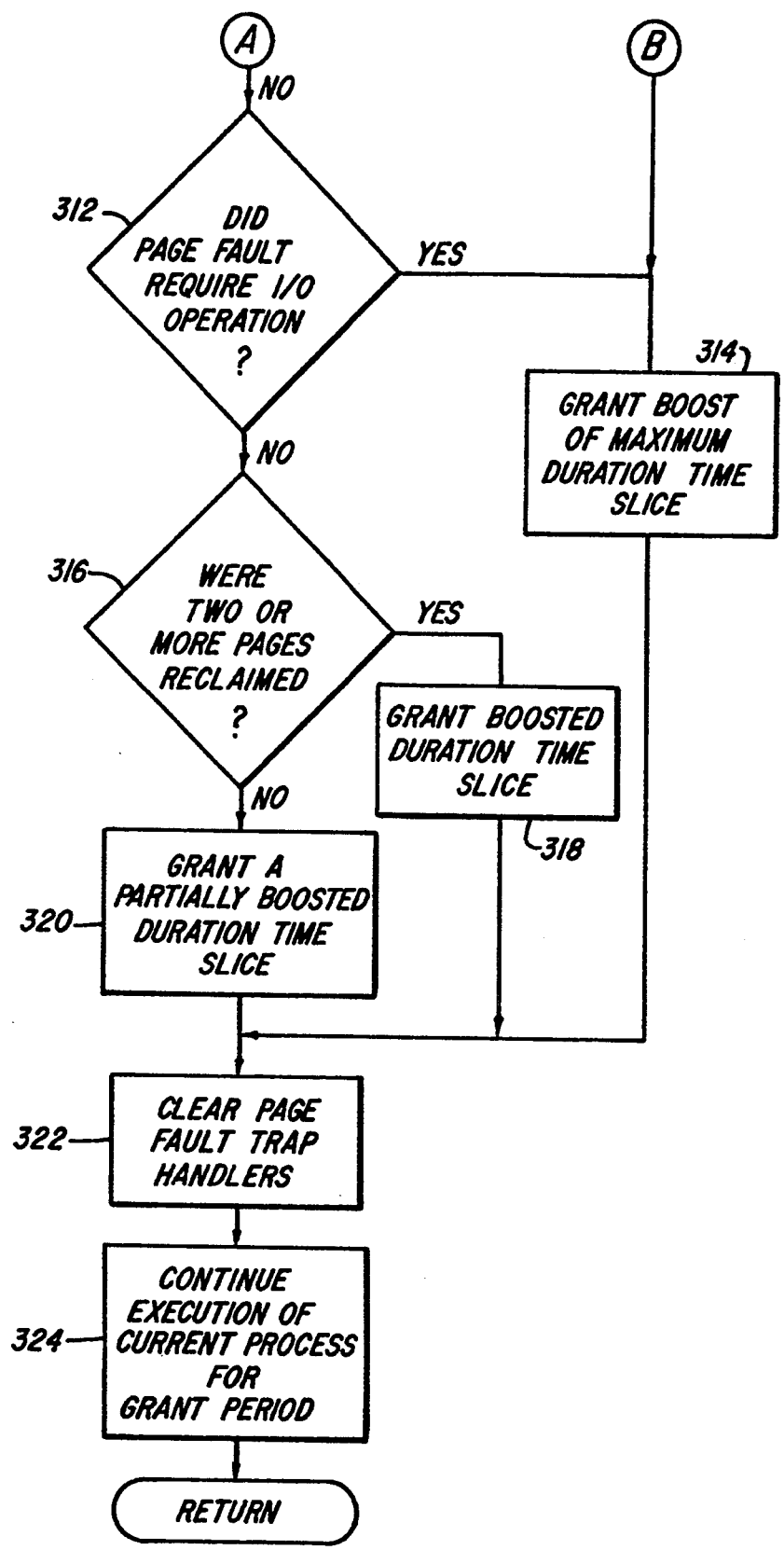

The time out management algorithm is entered whenever a plurality of processes are ready to run at the priority level of the process currently owning the central processing unit 20. Referring to FIGS. 4 and 4a, a logical flowchart of the process is illustrated. The process is entered after a time out has occurred at step 300 where it is determined if a task having a higher priority than the currently executing task has become ready to run. If so, the priority preemptive aspect of the scheduling algorithm controls and step 302 is executed, resulting in the current process being terminated and control being returned to the dispatcher for dispatch of the higher priority process.

If no higher priority process has preempted the system, step 304 is executed resulting in interrogation of trap/signal handler 40 to determine if a page fault has occurred during processing of the current process. If not, the dynamic time allocation aspects of the present invention are not invoked. Steps 306 and 308 reflect default allocation of the minimum time slice to the next task in the ready to run queue and dispatch of the next process.

The YES branch from step 304 indicates occurrence of the minimum conditions for dynamic allocation of additional time to a currently executing processor, those being the occurrence of page fault indicating that some sort of memory operation occurred with processing of the current process for the concluding time slice. Because memory operations are so time consuming, it is probable that the current process has not yet used the data recovered from the memory operation. Accordingly, the time management algorithm can allocate additional time to the current process to make use of the data.

At step 310, it is determined if the number of free pages in computer memory 22 is below some minimum threshold. If it is, a possible overcommit of memory has occurred and the possibility of the data being overwritten in computer memory 22 is present. The current process is granted the maximum permissible time to make use of the data. Step 314 is executed, resulting in the maximum duration time slice system 10 is permitted to allocate, being tacked to the time slice for the current process. In the preferred embodiment the minimum time slice is 32 milliseconds. The maximum time slice is 248 milliseconds. Thus, the current process receives a total of 280 milliseconds of central processing time.

If memory 22 is not in a possible overcommit situation, is represented by the NO branch from step 310, the nature of the page fault becomes of interest. If the page fault is associated with an I/O operation to auxiliary memory, the operation was a particularly time consuming event. Step 314 is executed and the current process is granted a maximum duration time slice to utilize the data. The current process will receive a total of 280 milliseconds of central processing time. If a process had received a boost before a time out occurred, the process may receive a total time slice of 376 milliseconds.

If the page fault was not associated with an I/O operation, it is determined at step 316 if two or more page reclaims were made during current time slice. If YES, the current process is granted an additional time slice of 128 milliseconds for a total processing time of 160 milliseconds. If only one page reclaim occurred, indicated by the NO branch of step 316, step 320 is executed to allocate additional time to the current time slice 96 milliseconds in duration. The total processing time thus will be 128 milliseconds.

Once the boost period for the time slice has been determined (steps 314, 318, or 320) step 322 is executed to reset the counters established in trap/signal handler 40 so that the current process cannot be granted another consecutive time slice boost. Step 324 simply indicates that execution of the current process continues without a context switch. Upon time out of the current process, execution is handed off to dispatcher 38 for dispatch of the next process.

No static time slice duration value can be set which will work optimally for all situations. The present invention integrates scheduling, time-out management, memory overcommit situations and paging detection to provide dynamic adjustment of the time slice duration value improving system responsiveness and system operating efficiency. The more constrained computer memory is, the more beneficial the system and method of the present invention is in improving system throughput. The benefit is provided by reducing the frequency of occurrence of page faults.

While the invention has been particularly shown and described with reference to a preferred embodiment, it will be understood by those skilled in the art that various changes in form and detail may be made therein without departing from the spirit and scope of the invention.

What is claimed is:

1. A method of reducing the frequency of occurrence of page faults in a data processing system having a central processing unit, a computer memory having a plurality of pages therein, and a time distribution operating system for managing the central processing unit and the computer memory by granting various processes central processing unit time within predefined quanta of time known as time slices on a rotating basis, the method comprising the steps of:

executing a current process on the central processing unit for a predetermined time slice;

responsive to occurrence of a storage access operation during execution of the first current process, allocating a supplemental time slice to the current process for execution; and continuing execution of the current process for the supplemental time slice.

2. A method of reducing the frequency of occurrence of page faults in a data processing system having a central processing unit, a computer memory having a plurality of pages therein, and a time distribution operating system for managing the central processing unit and the computer memory as set forth in claim 1, wherein the step of allocating a supplemental time slice further comprises the steps of:

monitoring the number of free pages in the computer memory;

responsive to the number of free pages falling below a minimum threshold, allocating a maximum duration time slice to the current process;

responsive to occurrence of a page fault requiring an input/output operation to the computer memory, allocating the maximum duration time slice to the current process; and responsive to occurrence of a page reclaim operation, allocating an additional time slice to the current process the duration of which is a function of the number of pages reclaimed but which is less than the maximum duration time slice.

3. A method of reducing the frequency of occurrence of page faults in a data processing system having a central processing unit, a computer memory having a plurality of pages therein, and a time distribution operating system for managing the central processing unit and the computer memory as set forth in claim 2, wherein the method is initiated by timing out of a process executing on the central processing unit.

4. A method of reducing the frequency of occurrence of page faults in a data processing system having a central processing unit, a computer memory having a plurality of pages therein, and a time distribution operating system for managing the central processing unit and the computer memory as set forth in claim 2, and further comprising the step of:

responsive to allocation of a supplemental time slice to the current process, preventing allocation of a second consecutive supplemental time slice to the current process.

5. A method of reducing the frequency of occurrence of page faults in a data processing system having a central processing unit, a computer memory having a plurality of pages therein, and a time distribution operating system for managing the central processing unit and the computer memory as set forth in claim 4, wherein the step of avoiding allocation of a second consecutive supplemental time slice includes the step of clearing a counter tracking occurrence of storage access operations.

6. A data processing system having a plurality of virtual storage areas comprising:
   a central processing unit;
   a computer memory having a plurality of pages therein:
   time distribution system operating means for managing the central processing unit and the computer memory by granting various processes central processing unit time within predefined quanta of time known as time slices on a rotating basis;
   a plurality of processes for execution on the central processing unit;
   means for ordering the processes for execution;
   means for dispatching a current process to the central processing unit for the predetermined time slice; and
   means responsive to occurrence of a storage access operation associated with the computer memory after dispatch of the current process for allocating a supplemental time slice to the current process, whereby frequency of occurrence of page faults is reduced during over commit of the computer memory.

7. A data processing system as set for in claim 6 wherein the means for allocating a supplemental time slice further comprises:
   means for monitoring the number of free pages in the computer memory;
   means responsive to the number of free pages falling below a minimum threshold for allocating a maximum duration time slice to the current process;
   means responsive to occurrence of a page fault requiring an input/output operation to the computer memory for allocating the maximum duration time slice to the current process; and
   means responsive to occurrence of a page reclaim operation for allocating an additional time slice to the current process, the duration of which is a function of the number of pages reclaimed but which is shorter in duration than the maximum duration time slice.

8. A data processing system as set forth in claim 7, and further comprising:
   means responsive to allocation of a supplemental time slice to the current process for preventing allocation of a second consecutive supplemental time slice to the current process.

9. A data processing system as set forth in claim 8, wherein the means for preventing allocation of a second consecutive supplemental time slice includes means for clearing a counter tracking occurrence of access operations to computer memory.

* * * * *